March 10, 1964 J. MARTIN 3,124,324
EJECTION OF ONE BODY FROM ANOTHER
Filed Jan. 16, 1962 5 Sheets-Sheet 1
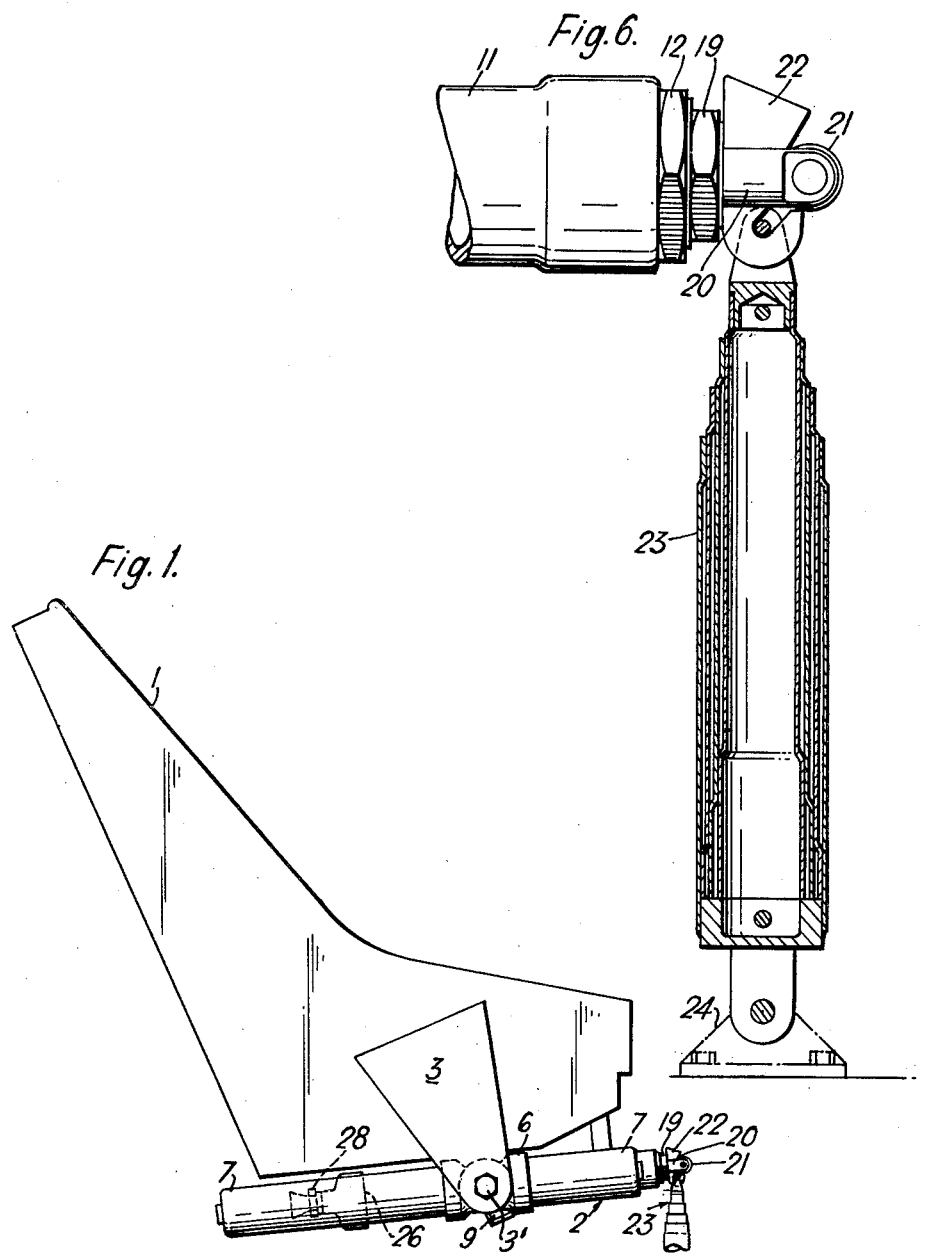
Inventor
JAMES MARTIN
By

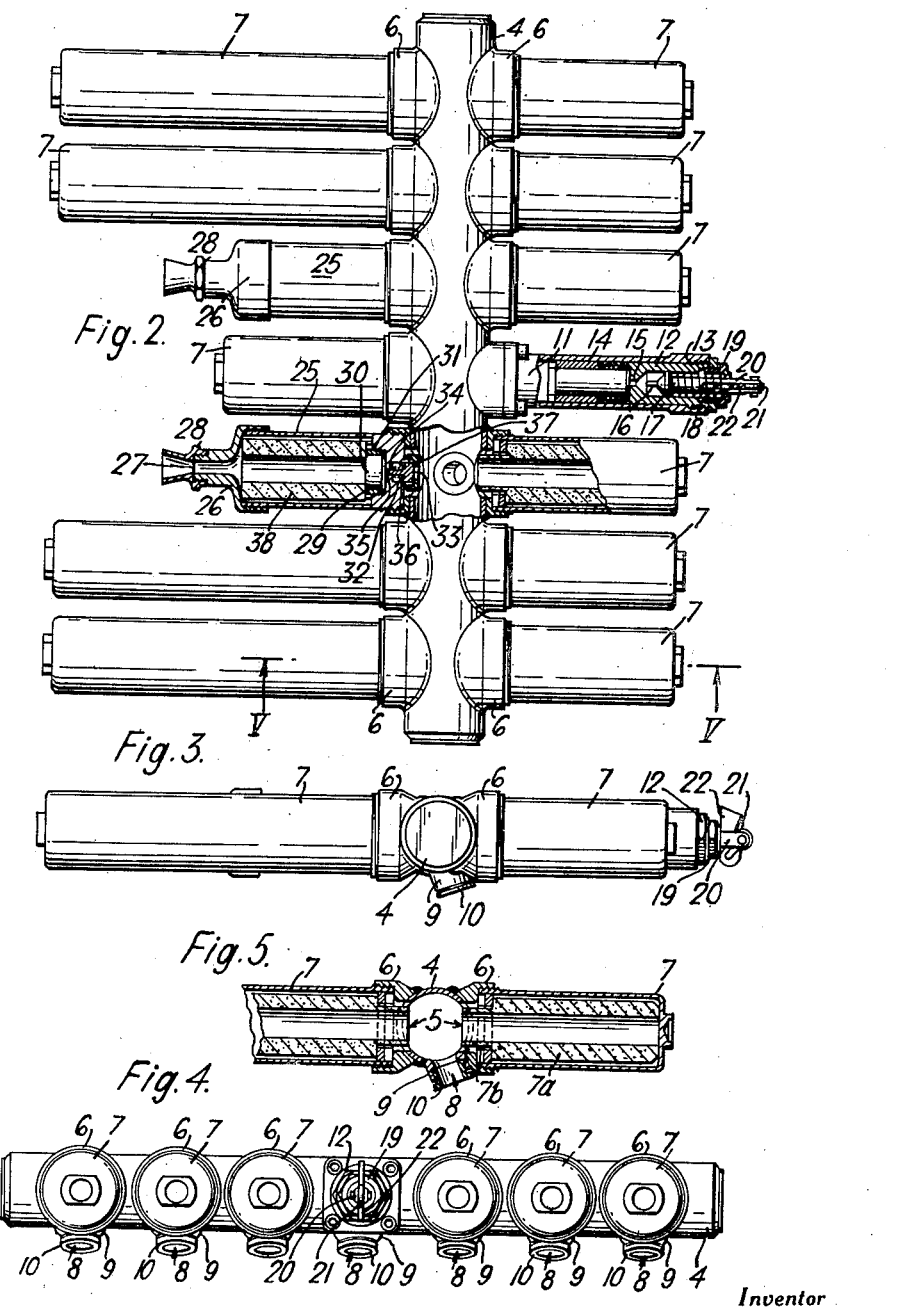

March 10, 1964  J. MARTIN  3,124,324
EJECTION OF ONE BODY FROM ANOTHER
Filed Jan. 16, 1962  5 Sheets-Sheet 4
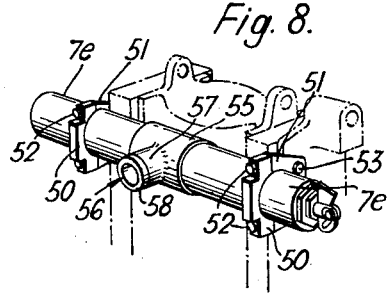
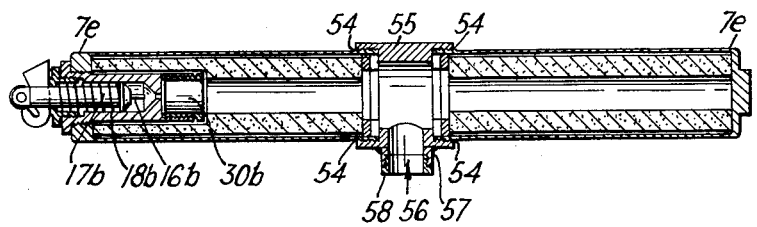
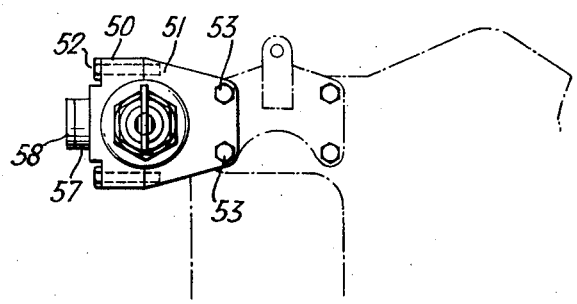
Inventor
JAMES MARTIN
By Kurt Kelman
agent

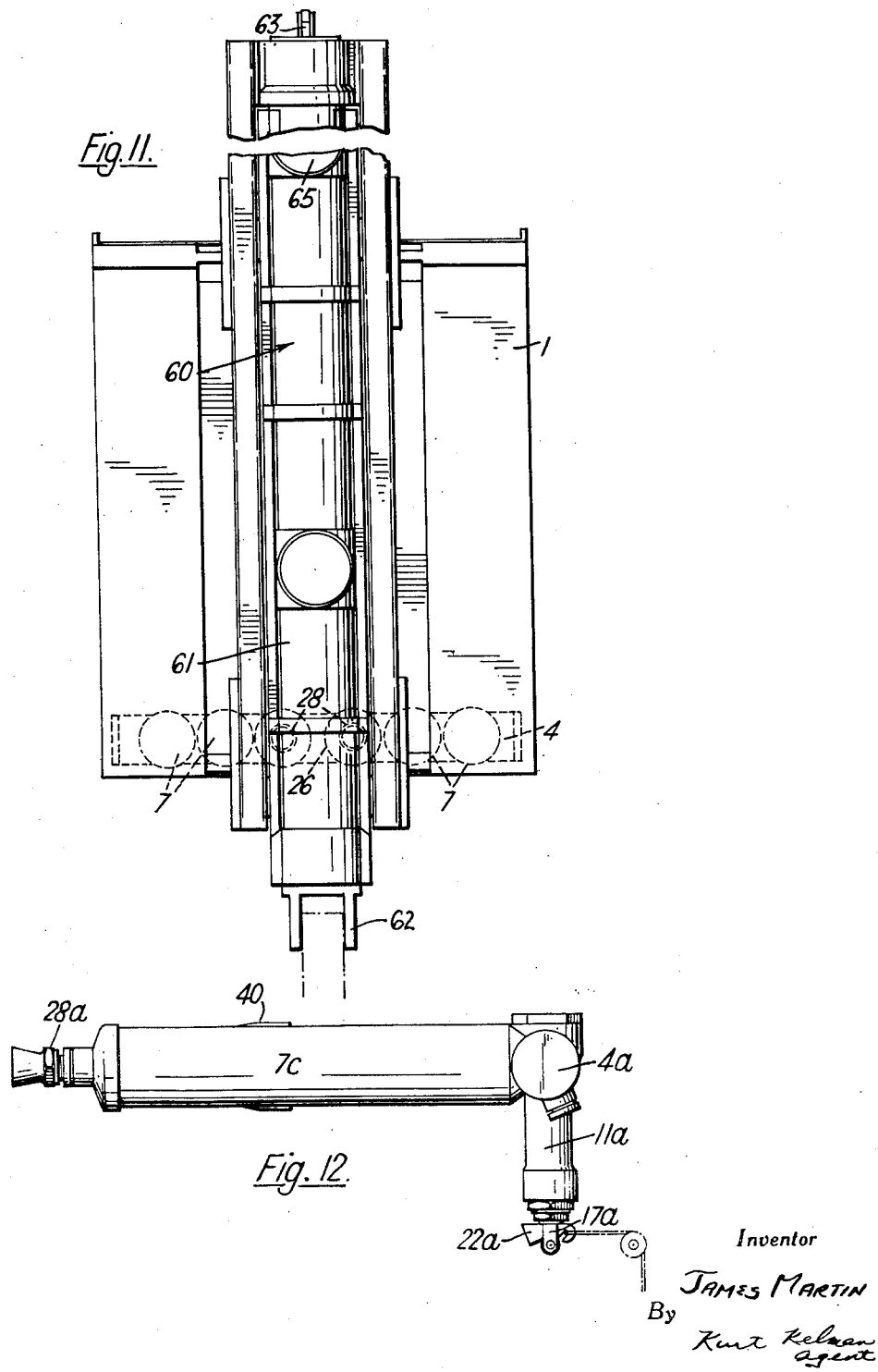

United States Patent Office 3,124,324
Patented Mar. 10, 1964

3,124,324
EJECTION OF ONE BODY FROM ANOTHER
James Martin, Southlands Manor, Southlands Road,
Denham, near Uxbridge, Middlesex, England
Filed Jan. 16, 1962, Ser. No. 166,490
Claims priority, application Great Britain Jan. 20, 1961
10 Claims. (Cl. 244—122)

This invention concerns the ejection of one body from another and is especially concerned with the ejection of an airman and his seat from an aircraft.

Thus, the invention is particularly applicable to the projection of aircraft ejection seats from aircraft, such seats usually comprising a seat pan mounted on a beam or frame (both hereinafter called, for convenience, a "seat frame") adapted to be projected with the seat pan bodily from the aircraft, ejection means being provided to propel the ejection seat in a predetermined direction from the aircraft as and when required as, for example, in an emergency either in the air or at ground level.

In aircraft ejection seat successfully adopted in practice in the past, ejection of the seat from the aircraft has been effected by means of an ejection gun comprising two or more telescopically co-operating parts adapted to be thrust axially apart by propulsion gases generated by the firing of at least one combustible cartridge, such gun operating between the seat frame and a fixed part of the aircraft and being located in such a position as to exert the thrust along the path that it is desired that the ejection seat should travel as it moves from the aircraft. The well known Martin-Baker aircraft ejection seats are of this character and are described in, amongst others, the Martin Patents Nos. 2,467,763, 2,527,020, 2,569,638, and 2,708,083.

When an ejection seat/airman combination is ejected from an aircraft in an emergency, it is extremely desirable that the seat/airman combination should obtain a high velocity along the predetermined path in as short a time as possible, consistent with the application of physiologically acceptable acceleration values to the airman: that is to say, it is important that the trajectory of the seat/airman combination relative to the aircraft flight path at the time of ejection should be such that the combination will adequately clear parts of the aircraft, such as the empennage, in any flight condition and especially at high aircraft speeds and/or when ejection occurs during a dive. It is also vital, when ejection takes place at low aircraft speeds and altitude (for instance at zero aircraft speed and zero altitude), that the seat/airman combination should have a trajectory of adequate height and duration to afford sufficient time for the deployment and effective operation of the airman's parachute or parachutes by which his subsequent descent is controlled.

The ejection gun of an ejection seat of the above described character can only produce an effective accelerating thrust during the time that the telescopically co-operating parts of the gun are inter-engaged. This means that the ejection gun must produce a very high short-term acceleration in order to achieve a high seat/airman combination velocity and, accordingly, the maximum attainable velocity is limited by the maximum acceleration value that can safely be applied to the airman by the operation of the ejection gun.

An object of the present invention is to provide an ejection system in which the present-day requirements are more nearly met than hitherto. A further object of the invention is to provide aircraft ejection seat arrangements in which seat ejection is assisted by rocket propulsion and in which the trajectory of the seat/airman combination is suitable for safe ejection from the aircraft over a wide range of aircraft flight conditions, including the zero-speed, zero-altitude case.

The system of the present invention comprises ejection means for ejecting the seat from the aircraft in a predetermined direction, at least one primary rocket motor for accelerating the seat along said predetermined direction by producing thrust in a direction aligned or substantially aligned with said direction, the system further comprising at least one auxiliary rocket motor adapted to produce thrust in a direction such as to cause variation of the flight path of said seat.

Conveniently the means for ejecting the seat from the aircraft comprises the ejection gun and a rocket motor combination described and claimed in my co-pending patent application Serial No. 150,670 filed November 7, 1961 and, in applying the present invention to such an arrangement, at least one auxiliary rocket motor is provided for projecting propulsion gases in such a direction that the resultant line of thrust of the or each such auxiliary rocket motor is transverse to the line of thrust of the or each rocket motor that assists the ejection gun in the ejection and propulsion of the ejection seat along the predetermined flight direction, the direction of the resultant thrust of the or each auxiliary rocket motor being chosen to suit the particular circumstances in which the or each such auxiliary rocket motor is used.

For instance, as described in my British Patent No. 843,269, an aircraft ejection seat is often subject to a pitching moment: one or more auxiliary rocket motors in an arrangement in accordance with this invention may thus be employed to counteract the said pitching moment as an alternative to the arrangement, employed for this purpose, described in my said Patent No. 843,269. The use of auxiliary rocket motors, in accordance with the present invention, is more elegant than the arrangement of said Patent No. 843,269 and enables the pitching moment or other undesired flight path-perturbing influences readily to be counteracted.

Thus one or more auxiliary rocket motors may be used, in accordance with the invention, to apply thrust to the ejection seat, so as either to prevent or minimise departure of the seat from the predetermined direction, or to cause a chosen departure of the seat from the direction predetermined by the ejection means.

The or each auxiliary rocket motor will preferably be permanently fixed in position but alternatively may be arranged for angular adjustment to vary the direction of its resultant thrust with respect to the ejection seat.

The or each auxiliary rocket motor may constitute part of an assembly comprising the rocket motor or motors for assisting in ejecting the seat.

In order that the invention may be more readily understood, three embodiments of the same will now be described by way of example with reference to the accompanying drawings in which:

FIGURE 1 is a diagrammatic illustration of part of an aircraft ejection seat equipped with a rocket motor pack of the construction described in my co-pending patent application Serial No. 150,670, filed November 7, 1961 but modified to incorporate auxiliary rocket motors in accordance with the present invention;

FIGURE 2 is a part-sectional plan view of the rocket motor pack of the seat shown in FIGURE 1;

FIGURE 3 is a side elevation of the rocket motor pack of FIGURE 2;

FIGURE 4 is a front elevation of the rocket motor pack of FIGURES 2 and 3;

FIGURE 5 is a fragmentary longitudinal sectional view on line V—V of FIGURE 2;

FIGURE 6 is a fragmentary vertical part-sectional view of a telescopic actuating member for firing the rocket motors of said pack;

FIGURE 8 is a perspective view of an ejection seat having an auxiliary rocket motor secured to the frame of the seat near the top thereof;

FIGURE 9 is a medial longitudinal section through the auxiliary rocket motor shown in FIGURE 8;

FIGURE 10 is a fragmentary side elevation of the auxiliary rocket motor and part of the ejection seat of FIGURE 8 and showing the manner in which the motor is secured to the seat;

FIGURE 11 is a back view of the seat shown in FIGURE 7, schematically illustrating the ejection gun; and FIGURE 12 is a side view of FIGURE 7.

Figure 7:
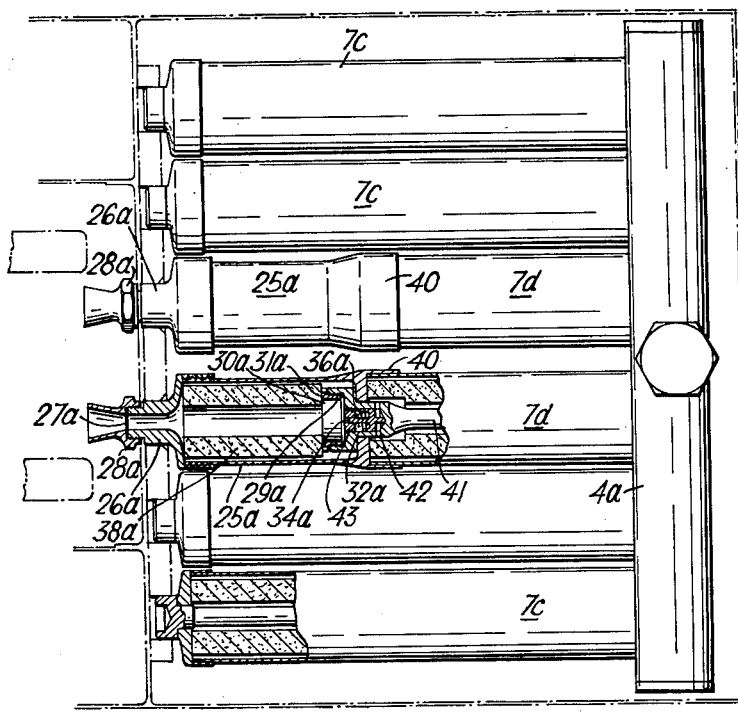
FIGURE 7 is a part-sectional plan view of a second embodiment of a rocket motor pack including a pair of auxiliary rocket motors.

An arrangement constituting a preferred embodiment of the invention is illustrated in FIGURES 1 to 6 and 11. FIGURE 1 shows diagrammatically an ejection seat having a rocket motor pack comprising primary rocket motors for producing thrust in a predetermined direction and, in accordance with the invention, auxiliary rocket motors for producing thrust in a direction transverse to the line of thrust of the primary rocket motors. The conventional ejection gun is not shown in FIGURE 1 but the well known construction of such ejection guns is illustrated schematically in FIGURE 11. As shown there, the ejection gun 60, which effects initial ejection of the seat from the aircraft, is generally of the construction disclosed in U.S. Martin Patent No. 2,527,020. It comprises telescopically interfitted tubes including an outer tube 61, the lower end of which is secured to the aircraft structure, as indicated at 62. An inner tube (not shown) is secured at its upper end to the seat structure and mounts a firing mechanism and primary cartridge in the manner disclosed in my Patent No. 2,527,020. The firing mechanism includes a withdrawable sear 63 which, upon withdrawal, first retracts and then releases a firing pin (not shown) that is impelled by a spring to fire the primary cartridge. Firing of the primary cartridge generates gas pressure within the gun to cause extension thereof to eject the seat. As the gun extends, secondary cartridges 65 at the outer gun tube 61 are sequentially exposed to the hot gas within the gun to be fired and contribute incrementally to the gas pressure in the gun to boost the acceleration of the seat. As the seat leaves the aircraft, the gun tubes separate and the thrust due to the gas pressure within the gun rapidly decays, as the gas within the inner tube exhausts to atmosphere via the lower end of the tube.

The seat of FIGURE 1 comprises a seat pan 1 beneath which is mounted a rocket motor pack generally indicated at 2. The pack 2 is conveniently secured to the seat pan 1 by means of bolts 3' fixing the pack 2 to dependent brackets 3 on each side of the seat pan 1. By loosening the bolts, the pack may be angularly adjusted with respect to the seat.

The construction of the rocket motor pack 2 is shown in detail in FIGURES 2 to 5 and, as will be seen from these figures, the pack comprises a central tubular spine 4 that is closed at its ends and adapted to be supported at these ends by the aforesaid brackets 3. The spine 4 has at intervals along its length a series of diametrically opposite ports 5 (see FIGURE 5) that communicate with tubular bosses 6 welded or otherwise suitably secured to the spine 4 and having internal screw threads to receive complementary screw-threaded heads of canisters 7 containing charges of propellent and constituting the primary rocket motors of the pack. As will be observed from FIGURE 2, the canisters 7 are of different lengths and contain different amounts of propellent charge, the arrangement of the canisters of different size on the spine 4 being selected to provide an appropriate location of the centre of gravity of the rocket motor pack as a whole. It will of course be understood that the total propellent charge weight is selected to provide the pack with a desired thrust capability and burning time and it will be apparent that the arrangement is adaptable to different installations by appropriate selection of canister sizes to be fitted to the spine to give a desired total charge weight.

The charges in the canisters 7 are preferably extruded or similarly formed tubular bodies of solid charge material as indicated at 7a at FIGURE 5. For reasons that will be explained hereinafter the charge 7a in each canister preferably has a terminal extension 7b that extends through the relevant port 5 in the spine 4 so as to project into the bore of the latter.

The spine 4 is further provided at intervals along its length with a series of exhaust ports 8 that, as shown in FIGURE 5, have their axes directed forwardly and downwardly from the axis of the spine 4 when the latter is so orientated that the canisters 7 are in a substantially horizontal attitude. The ports 8 communicate with nozzle stubs 9 having hollow plugs 10 therein, such plugs 10 retaining frangible diaphragms (not shown) that close the ports 8 until the charges in the canisters 7 are fired.

Near the mid-point of its length the spine 4 has a port equivalent to a forward-facing port 5 but communicating with a breech tube 11 instead of with a canister 7 as in the case of the ports 5. The breech tube 11 mounts a firing mechanism that comprises a tubular body 12 which fits within the breech tube 11, being secured in the latter by means of co-operating screw threads 13 on the body 12 and breech tube 11 respectively. The inner end of the body 12 is formed by a detachable tubular plug 14 that constitutes a housing for an initiating cartridge (not shown), the body 12 being divided internally into two chambers by a partition 15 having a central aperture through which a firing pin 16 may pass to enter the initiating cartridge housing 14 and fire a cartridge located therein.

The firing pin 16 is mounted on the head of a bifurcated plunger 17 urged towards the partition 15 by means of a compression spring 18 trapped between the head of plunger 17 and a cap 19 that closes the outer end of the body 12. The plunger 17 extends through a central aperture in the cap 19 and the arms 20 of such plunger support a roller 21 for engagement with a sear 22 that extends between the arms 20 and is interposed between the roller 21 and the cap 19 whereby withdrawal of the sear first causes outwards (forwards) movement of the plunger 17 to compress spring 18 and thereafter releases the plunger 17 so that the spring 18 may impel the plunger inwardly and cause the firing pin 16 to pass through the aperture in the partition 15 to ignite an initiating cartridge in the cartridge housing 14 at the inner end of the body 12.

The arrangement for withdrawing the sear 22 at an appropriate instant during the ejection sequence may be of any suitable form and may, for instance, be as in FIGURE 6, from which it will be seen that the means for withdrawing sear 22 comprise a telescopic member 23, the lower end of which is anchored by suitable bracket 24 to the aircraft structure, the telescopic member 23 being arranged to extend during the course of initial ejection of the seat until the seat has reached the point at which the sear 22 is to be withdrawn, when the member 23 ceases to extend and thus holds the sear 22 stationary whilst the seat continues along its ejection path.

It will be understood that when an initiating cartridge in the cartridge housing 14 is fired by the operation of the firing pin 16 upon withdrawal of the sear 22, the hot combustion products of such cartridge enter the bore of spine 4. Since a canister 7 is mounted on the spine 4 directly opposite to the breech tube 11, the charge in such canister will immediately be ignited by the blast of hot combustion products entering the spine from the breech tube 11 and because the charges in the other canisters project into the bore of the spine 4 through their respective ports 5 the charges 7a in at least those canisters 7 near to the breech tube 11 will also be ignited by the hot combustion products entering the spine from the breech tube 11. Any charges 7a not so ignited by the said hot combustion products will of course become ignited almost immediately by the efflux entering the spine 4 from the ignited charges 7a.

The frangible diaphragms that close the ports 8 are designed to have sufficient strength to resist rupture by the pressure wave due to the ignition of the initiating cartridge so that the spine is maintained sealed against the external atmosphere until at least one of the charges 7a has ignited and built up pressure in the spine sufficient to rupture the frangible diaphragms. In this way it is ensured that at least one of the charges will be properly ignited before the spine is unsealed. It will be understood that in certain circumstances, for instance at high altitude, ignition of the charges 7a might be prejudiced by low atmospheric pressure within the spine 4 were this open to the atmosphere prior to full ignition of at least one charge 7a.

In this embodiment a pair of auxiliary rocket motors 25 are positoined one on each side of the canister 7 opposite the breech tube 11.

Each auxiliary motor 25 comprises a canister open at its rear or outer end. A substantially bell-shaped end cap 26 is positioned over the open end of the canister and the cap 26 is screw-threaded internally around its wider end where it is threadedly secured to the canister. The cap 26 is provided with a central axial bore which is normally closed to the atmosphere by a frangible diaphragm 27, this diaphragm being retained in position by a jet nozzle 28.

The forward end of the canister of each auxiliary rocket motor 25 is provided with an end wall which has on the rear or inner surface thereof an internally screw-threaded annular recess 29 which houses an initiating cartridge 30, said cartridge 30 being retained in the recess 29 against axial movement by an externally screw-threaded sleeve 31 fitted into the recess 29.

On the forward surface of the said end wall an annular recess 32 is provided in which a small piston 33 may slide. The piston 33 is formed integrally with a firing pin 34 which slides in a bore 35 passing through the end wall so that if the pin 34 passes rearwardly through the bore 35 the rear end of the pin 34 will contact the initiating cartridge 30. The piston 33 and firing pin 34 are normally urged forwardly by a helical compression spring 36. A centrally bored end cap 37 is provided to retain the piston 33 within the bore 32 with the forward surface of the piston 33 exposed to the atmosphere within spine 4.

It will be appreciated that with this arrangement, when the primary rocket motors are fired, the increase in pressure in the spine 4 drives the piston 33 rearwardly and forces the firing pin 34 rearwardly to engage the initiating cartridge 30 which ignites the charge 38 in the cylinder 25.

FIGURES 7 and 12 show the rocket motor pack of an arrangement constituting a second embodiment of this invention. The pack of FIGURE 7 is similar to that of the arrangement of FIGURES 1 to 6, differing from the pack of the latter arrangement mainly in that the spine of the pack is positioned at the front thereof instead of being positioned midway between the front and rear of the assembly. In view of this repositioning of the spine the canisters of the rocket motors all project in one direction only from the spine, i.e. in a rearward direction. Thus the pack of FIGURE 7 comprises a tubular spine 4a similar in construction to the spine 4 of the previously described pack but having its various ports modified in position to suit the different orientation of the canisters 7c, 7d of the rocket motors of the pack.

The pack of FIGURE 7 includes two short canisters 7d having auxiliary rocket motors secured to the rear ends of these short canisters 7d.

The short canisters 7d are each closed at their rear end by a cap 40 which is held in position by a bolt 41 passing axially through the canister 7d and secured at its front end in the spine 4a. This bolt 41 also holds in coaxial alignment with its canister 7d, an auxiliary rocket motor canister 25a which extends rearwardly from the cap 40 and is itself furnished with a bell-shaped rear end cap 26a.

As in the pack of FIGURES 1 to 6, the primary rocket motors and the auxiliary rocket motors of the pack of FIGURE 7 each employ an extruded or otherwise appropriately manufactured tube of propellant charge. The tubular propellant charge 38a for each auxiliary rocket motor is rather shorter in length than the canister 25a of such motor so as to accommodate the head of the bolt 41, which bolt head has a recess 29a for receiving an initiating cartridge 30a.

The head of each bolt 41 has an axial bore 32a communicating via radial bores 42 with the interior of the corresponding main rocket motor canister 7d. The bolt head end of this axial bore 32a is counterbored to receive an axially slidable piston having a rearwardly-directed firing pin 34a which is urged forwardly by a helical compression spring 36a but which is adapted to be driven rearwardly by the pressure of the gases generated by the associated primary rocket motor, such gases entering the counterbore of the bolt head, through the radial and axial bores 42 and 32a, and forcing the piston and its firing pin 34a rearwardly against the action of the spring 36a.

The firing pin 34a is guided in a central aperture in a plug 43 screwed into the counterbore in the head of the bolt 41 and an initiating cartridge 30a is also held in said counterbore by a sleeve 31a screwed into such bore. Thus when the firing pin 34a is driven rearwardly it strikes the initiating cartridge 30a to cause ignition of the propellant charge of the auxiliary rocket motor.

The gases of the auxiliary rocket motor exhaust via an axial bore through the rear end cap 26a of the canister 25a of this motor and issue from a jet nozzle 28a screwed on to the rear end of the central boss of such end cap 26a, the said jet nozzle 28a being of a rearwardly divergent or venturi character.

Each of the nozzles 28a of the auxiliary rocket motors is furnished with a frangible diaphragm 27a which closes the nozzle 28a in normal circumstances but which is fractured or displaced when the auxiliary motor fires.

As seen in FIGURE 12, the firing mechanism is substantially identical with that of the embodiment of FIGURES 1 to 6, differing only in the orientation of the breech tube 11a that corresponds with breech tube 11 of the embodiment of FIGURES 1 to 6. In the FIGURE 7 embodiment, the breech tube 11a projects downwardly from the spine 4a and communicates with the interior of the latter via a suitably positioned port (not shown). As in the case of the FIGURES 1 to 6 embodiment, the breech tube houses a tubular body which, in turn, houses an initiating cartridge and a spring-loaded firing pin on a plunger 17a that co-operates with a withdrawable seat 22a which, on withdrawal, first retracts and then releases the plunger 17a to permit the firing pin to be impelled inwardly by its spring to fire the initiating cartridge.

Thus with an assembly of primary and auxiliary rocket motors as above described with reference to FIGURE 7, the sequence of operations is that when the primary rocket motors have been fired to assist in the propulsion in the required direction of the ejection seat, the auxiliary rocket motors are then fired and these apply to the seat at a predetermined stage in the operations a preselected impulse in the desired direction transverse to, and conveniently at right angles to, the thrust line of the primary rocket motors. The auxiliary rocket motors may be adapted to apply the transverse thrust for a predetermined part only of the duration of the main rocket thrust.

It will be apparent therefore that by a careful selection of the type and quantity of the rocket propellants used, an impulse can be applied to the ejection seat at a predetermined angle and that the flight path of the seat/airman combination may thus be regulated or compensated for other externally applied forces.

It should be understood that although in the arrangements described above, two rearwardly directed auxiliary rocket motors have been illustrated, a single such motor or indeed any other appropriate number which can be symmetrically arranged relative to the fore and aft centre line of the seat for rearward discharge may be employed.

FIGURES 8, 9 and 10 illustrate the auxiliary rocket motor of an arrangement constituting a third embodiment of the invention. From FIGURES 8 and 10 it will be seen that this motor is of generally cylindrical shape secured at each of its ends by a pair of plates 50, 51 bolted together by studs 52, the plates 51 being secured to an ejection seat near the top thereof by studs 53.

The auxiliary rocket motor itself comprises a pair of coaxial cylindrical canisters 7e each open at one end, these open ends being positioned opposite one another. The open ends of the canisters 7e are externally screw-threaded at 54, these threaded portions being adapted to engage an internally screw-threaded T-piece 55 provided with a rearwardly directed exhaust port 56. The port 56 communicates with a nozzle stub 57 having a hollow plug 58 therein, such plug 58 retaining a frangible diaphragm (not shown).

One of the canisters 7e incorporates a firing mechanism very similar to that described with reference to FIGURES 1 to 6, namely a firing pin 16b mounted on a plunger 17b urged towards an initiating cartridge 30b by a compression spring 18b.

The auxiliary rocket motor has been illustrated as being fixed in permanent position on the ejection seat but it will be appreciated that the studs 53 may be replaced by nuts, such as shown at 3' in FIGURE 1, to permit angular adjustment to vary the direction of the thrust of this motor so that the impulse imparted to the seat may be arranged at any appropriate angle to regulate the flight of the seat/airman combination along the desired path.

I claim:

1. An ejection system for ejecting an ejection seat/airman combination from an aircraft, comprising the combination of
   (a) an ejection gun for ejecting the combination ejection seat/airman from the aircraft in a predetermined direction relatively to the aircraft;
   (b) a primary rocket motor means carried by the seat independently of the ejection gun and being arranged to produce a thrust vector extending substantially through the center of gravity of the combination ejection seat/airman and substantially aligned with said predetermined direction whereby the combination ejection seat/airman is accelerated in said direction;
   (c) an auxiliary rocket motor means arranged to produce a thrust vector causing a variation in the flight path produced by the operation of the ejection gun and the primary rocket motor means; and
   (d) means for firing the primary and auxiliary rocket motor means individually and independently of the ejection gun after the combination ejection seat/airman has been ejected from the aircraft by the ejection gun.

2. The ejection system of claim 1, wherein the thrust vector of the auxiliary rocket motor means is transverse of the thrust vector of the primary rocket motor means.

3. The ejection system of claim 2, wherein the auxiliary rocket motor means thrust vector is at 90° to the primary rocket motor means thrust vector.

4. The ejection system of claim 1, wherein the auxiliary rocket motor means is mounted near the top of the ejection seat.

5. The ejection system of claim 1, wherein the primary and auxiliary rocket motor means constitutes a rocket motor assembly mounted under the ejection seat.

6. The ejection system of claim 5, wherein the firing means is common to the primary and auxiliary rocket motor means.

7. The ejection system of claim 5, wherein the rocket motor assembly comprises a tubular spine, a plurality of primary rocket motors and at least one auxiliary rocket motor being mounted on the spine, and a common exhaust system including the spine for said rocket motors.

8. The ejection system of claim 7, wherein each of said rocket motors comprises a canister detachably mounted on the spine and a propellant charge housed in each canister.

9. The ejection system of claim 7, wherein said firing means comprises a breech tube communicating with the spine and an initiating cartridge in said breech tube, combustion products from the cartridge being conducted into the spine to ignite the propellant charges in the canisters.

10. The ejection system of claim 9, wherein said breech tube further houses a firing pin for the initiating cartridge and means resiliently urging the firing pin into a cartridge firing position, means cooperating with the firing pin for first moving the firing pin to store energy in the resilient means and for thereafter releasing the firing pin to be impelled to said cartridge firing position by the energy stored in the resilient means.

References Cited in the file of this patent

UNITED STATES PATENTS

| | | |
|---|---|---|
| 2,541,087 | Musser | Feb. 13, 1951 |
| 2,552,181 | Kleinhans | May 8, 1951 |
| 2,736,236 | Martin | Feb. 28, 1956 |
| 2,931,598 | Sanctuary | Apr. 5, 1960 |
| 2,998,213 | Pitts | Aug. 29, 1961 |